United States Patent [19]

Lochner

[11] 4,251,381

[45] Feb. 17, 1981

[54] PASTY DAMPING AGENT DISPERSION

[76] Inventor: Kaspar Lochner, Karlsburger Str. 7b, 8000 München, Fed. Rep. of Germany

[21] Appl. No.: 24,516

[22] Filed: Mar. 28, 1979

Related U.S. Application Data

[63] Continuation of Ser. No. 843,989, Oct. 20, 1977, abandoned.

[30] Foreign Application Priority Data

Oct. 21, 1976 [DE] Fed. Rep. of Germany ....... 2647697

[51] Int. Cl.³ .............................................. C04B 43/00
[52] U.S. Cl. ........................................ 252/62; 181/294
[58] Field of Search ....................... 252/62, 72, 22, 23, 252/29, 30, 309; 181/294; 179/180

[56] References Cited

U.S. PATENT DOCUMENTS

| | | | |
|---|---|---|---|
| 2,345,198 | 3/1944 | Hodson | 252/22 |
| 2,398,187 | 4/1946 | McGregor et al. | 252/78.3 |
| 2,473,510 | 6/1949 | Denison et al. | 252/45 |
| 2,711,394 | 6/1955 | Veatch et al. | 252/30 |
| 2,761,844 | 9/1956 | Ackerman et al. | 252/29 |
| 3,244,626 | 4/1966 | Lyons et al. | 252/29 |
| 3,296,138 | 1/1967 | Cupper et al. | 252/78.5 X |
| 3,384,583 | 5/1968 | Groszek et al. | 252/29 |
| 3,482,062 | 12/1969 | Hecht | 179/180 X |
| 3,801,535 | 4/1974 | Joschko | 260/375 B |
| 3,812,937 | 5/1974 | Abbott et al. | 252/72 X |

FOREIGN PATENT DOCUMENTS 748905  5/1956  United Kingdom .

Primary Examiner—Harris A. Pitlick
Attorney, Agent, or Firm—Armstrong, Nikaido, Marmelstein & Kubovcik

[57] ABSTRACT

A damping agent for damping mechanical and/or acoustical vibrations. The agent includes a fluid phase of a polyglycol, silicone oil, mineral oil, and/or a saturated aliphatic or aromatic carboxylic acid ester having graphite dispersed therein. The graphite is dispersed by means of a wetting agent. Anti-oxidants and an agent to stabilize the structural viscosity of the damping agent may also be included.

34 Claims, No Drawings

PASTY DAMPING AGENT DISPERSION

This is a continuation of application Ser. No. 843,989, filed Oct. 20, 1977, now abandoned.

BACKGROUND OF THE INVENTION

The present invention relates to a pasty damping agent dispersion for damping mechanical and/or acoustical vibrations.

Damping agents for damping mechanical vibrations are known. For example, hydraulic oils have been proposed as damping agents. The disadvantage of these oils is that the heating of the damping agent occurring when a continuous load is applied cannot be eliminated sufficiently rapidly and thus the oils tend to overheat. There is a risk of excessive boiling of the damping agent.

German Auslegeschrift No. 1,128,586 describes a hydraulic medium treated with active carbon. This medium is capable of partially absorbing the gas developing in the medium but it is not suitable for use in damping devices as this medium does not possess a lubricating effect.

Expansible damping agents which harden as the load increases have also been proposed. However, damping agents of this type are only effective within narrow frequencies and amplitudes of the vibrations to be damped in relation to the dependence of their viscosity on the respective load. Owing to the hardening process they are also subject to the disadvantage of not possessing a sound absorbing quality.

Accordingly, a damping agent is sought which will not become foamy, i.e., which will possess good heat conducting properties under the influence of a continuous load. The agent should also serve as a lubricant for the stressed parts of the damping device and should be largely self-sealing. The damping agent should also be capable of exerting a constant damping action both in the event of impact stresses and also vibrations at low temperatures and also high temperatures and during continuous loading. In particular, the damping agent should be capable of damping or absorbing high amplitude impact stresses. It is also preferable for the agent to have a sound damping effect in the case of sound vibrations conducted through solids.

SUMMARY OF THE INVENTION AND DESCRIPTION OF PREFERRED EMBODIMENTS

The damping agent according to the invention accordingly consists of a fluid phase consisting of silicone oils, polyols, mineral oils and/or saturated aliphatic or aromatic carboxylic acid esters containing ground graphite and at least one wet-agent.

A silicone oil having a viscosity of at least approximately 20 centistokes (cSt) at 25° C. and preferably of at least approximately 1,000 cSt at 50° C. can be used as the fluid phase. Methyl and/or methylphenylsilicone oils have proved particularly suitable.

Polyglycols (polyoxyethylene esters) can be used as polyol and as the fluid phase of the dispersion. For example, the following polyglycols are suitable for use: polyethylene-, polypropylene- and polybutylene glycols as well as mixtures thereof and also branched polyglycols. Polyols which are derived from glycerine have also proved suitable. The viscosity of the polyols is preferably at least approximately 20 cSt at 50° C.

Mineral oils having a viscosity of at least approximately 20 cSt at 25° C. and preferably at least approximately 50 cSt at 50° C. and an ignition point of at least 160° C. can also be used as the fluid phase of the dispersion according to the invention. An example of this group consists of machine oils having a viscosity of 100–200 cSt at 20° C. and an ignition point of 190°–220° C. (DIN 51515).

Suitable aliphatic saturated esters consist, for example, of esters of saturated aliphatic univalent or multivalent $C_5$–$C_{12}$ alcohols, i.e. with one or more HO-groups and saturated aliphatic $C_5$–$C_{12}$ monocarboxylic acids.

Suitable aliphatic saturated diesters consist of esters of saturated aliphatic univalent and multivalent $C_5$–$C_{12}$ alcohols and saturated aliphatic $C_5$–$C_{12}$ dicarboxylic acids.

Suitable aromatic diesters consist of esters of aliphatic saturated univalent or multivalent $C_5$–$C_{12}$ alcohols and phthalic, terephthalic and isophthalic acids.

Suitable aromatic triesters consist of esters of aliphatic saturated univalent or multivalent $C_5$–$C_{12}$ alcohols and benzenetricarboxylic acids.

The esters of the following groups have proved particularly suitable: esters of pentaerythrite (pentaerythritol), trimethylol propane and trimethylpropanol with simple or branched $C_5$–$C_{12}$ carboxylic acids; esters of adipic acid such as benzyloctyladipate, dibutyladipate, diisononyladipate, dioctyladipate, adipic acid octyldecylesters and derivatives thereof; esters of glutaric and/or pimelic acid; esters of phthalic acid such as diethylhexylphthalate, dioctylphthalate, diisotridecylphthalate, didecylphthalate; esters of trimellitic acid, trimesinic acid and/or hemimellitic acid, for example, tridecal and trioctylesters of trimellitic acid.

The relative proportions of the fluid phase and graphite phase are adjusted according to the desired viscosity. A high viscosity necessitates a greater proportion of graphite particles. The larger the graphite particles used the greater the size of the fluid phase for a given viscosity. The degree of hardening of the dispersion can be regulated within certain limits by the selection of the size of the graphite particles, resp., of the quantity of graphite. The viscous fluid phase can be used as the base of the dispersion according to the invention either in its existing form or as mixtures thereof.

The viscous fluid phase is mixed with graphite having a leaf-shaped or spherical structure. The size of the graphite particles should not exceed 100μ. Graphite particles of 10μ or 5μ and smaller are especially suitable. Mixtures of different sized graphite particles can also be used. The graphite is present in the dispersion in an amount of 30–80%, especially 30–70%, more especially 40–60% by weight relative to the total weight of the dispersion.

With a particle size of 50μ the quantity of graphite added is especially approximately 60–80% by weight, more particularly, 70% by weight relative to the total weight of the dispersion. With a graphite particle size of 1μ the quantity of graphite is about 30–70% by weight relative to the total weight of the dispersion. When the size of the graphite particles employed is approximately 20μ the graphite constitutes approximately 60% by weight of the total dispersion. Graphite which is at least 98.5% pure is preferably used.

Wetting agents which prevent settling of the solid particles in the dispersion are added to the dispersion consisting of the fluid phase and graphite. The wetting agents are used in quantities of 0.1–8% by weight, more particularly, 0.5–6% by weight, and preferably 1–3% by weight relative to the total weight of the dispersion. The particular amount employed depends on the diameter of the graphite particles. The larger the graphite particles the less wetting agent is required. Moistening soaps are preferably used as a wetting agent and the amino soaps of fatty acids have proved particularly suitable. The amino soaps having a marked washing action are not as useful. Suitable soaps consist, for example, of 1,3-propylenediaminodioleate and compounds thereof with tallow fat acids; alkali salts and amino compounds of stearic, palmitic, linoleic acids and/or oleic acids; fatty alcohol sulfonates; alkyl aryl sulfonates; neutral fatty acid condensation products such as Na salt of oleic acid-N-methyl-taurin and naphthalene sulfonates and derivatives thereof.

It is advantageous to add to the dispersion according to the invention agents which stabilize the structural viscosity of the dispersion. Suitable agents are, for example, amorphous silicon dioxide and fine-ground aluminum silicate. The grain size of the agents for increasing the structural viscosity is preferably smaller than $0.5\mu$, and more specifically smaller than $0.1\mu$. The quantities added are in the range of approximately 0.1–10% and more specifically 0.5–5% and preferably 3% by weight relative to the weight of the total dispersion. Additions of organophilic bentonites and fine-ground asbestos have proved advantageous.

One embodiment of the invention is characterized by the addition of anti-oxidizing agents. The proportion of anti-oxidizing agents is at least 0.1% by weight relative to the total weight of the dispersion. Suitable agents are, for example, phenol and thiophenol compounds of the type described in *Ullmann's Encylcopaedia*, Volume 15, pages 217–220. Sterically restricted amino and phenol derivatives such as the cresol compounds and bisphenol compounds such as di-tert.-butyl-p-cresol and methylene-4,4-(2,6-ditert.-butylphenol) are particularly suitable for use in the dispersion according to the invention.

The dispersion according to the invention will be described in more detail by means of the following examples.

EXAMPLE 1

Trimethylpropane-adipinic acid octyldecylester: 50% by weight

Graphite (particle size smaller than $0.8\mu$): 45% by weight

Tallow fat acid diamino-dioleate (wetting agent): 5% by weight.

The dispersion has a density of 1.35 g/ml at 15° C. (DIN 51757), a viscosity of $2.2\times 10^6$ cP at 25° C. (DIN 51550) and an ignition point of approximately 290° C. (DIN 51376).

EXAMPLE 2

Trioctyltrimellitate: 50% by weight

Graphite (particle size smaller than $0.8\mu$): 40% by weight

Tallow fat acid-diamino-dioleate (wetting agent) 6% by weight

Amorphous silicium dioxide (particle size smaller than $0.1\mu$): 4% by weight

The dispersion has a density of 1.35 g/ml at 15° C., a viscosity of $2\times 10^6$ cP at 25° C. and an ignition point of 291° C.

EXAMPLE 3

Trimethylpropane-adipinic acid-octyldecylester: 50% by weight

Graphite (particle size smaller than $0.8\mu$): 40% by weight

Tallow fat acid-diamino-dioleate (wetting agent): 5% by weight

Amorphous silicon dioxide (particle size smaller than $0.1\mu$): 3% by weight

Di-tert.-butyl-p-cresol (anti-oxidizing agent): 2% by weight

The dispersion has a density of 1.3 g/ml at 15° C., a viscosity of $1.8\times 10^6$ cP at 25° C. and an ignition point of approximately 290° C.

EXAMPLE 4

Trioctyltrimellitate: 50% by weight

Graphite (particle size smaller than $0.8\mu$): 45% by weight 1.3 propylene-diaminodioleate (wetting agent): 5% by weight The dispersion has a density of 1.35 g/ml at 15° C., a viscosity of $2.1\times 10^6$ cP at 25° C. and an ignition point of approximately 290° C.

Other features of the embodiments according to the invention are listed in the subclaims. The above examples provide only a small selection of the damping agent dispersions according to the invention. The invention is not limited to these embodiments.

The dispersions according to the invention have a viscosity of approximately $1-4\times 10^6$ cP, more specifically, approximately $1.5-3\times 10^6$ cP at 25° C. The dispersion is self-sealing as the graphite particles are in part deposited or positioned on the cylindrical surfaces of the damping device. Another advantage of the dispersion according to the invention is that it has a largely temperature-independent damping characteristic. It can be temporarily loaded to approximately 300° C. and under pressure to approximately 400° C. without any change in the damping characteristic. When an ester or a mixture thereof having a correspondingly low setting point is used for the viscous organic fluid phase the temperature stability of the damping characteristic of the dispersion according to the invention can also be kept constant to ranges of about 0° C. The heat conductivity of the dispersion is in the range of approximately 3–3.5 cal/(cm)(sec)(°C.) and is thus far in excess of the conductivity of known high pressure oils (approximately 0.45 cal/g). The dispersion is also characterized by a constant flowability and thus the flowing dispersion is not removed behind nozzles or gaps through which it is pressed.

The dispersion is suitable for use in devices used as engine mounts, wheel stabilizers, impact absorbers and steering stabilizers. The damping devices with which the damping agent dispersions according to the invention are used have the advantage over damping devices using conventional fluids as damping agents that when influenced by low frequency vibrations they demonstrate a linearly harmonized force reduction, i.e., a powerful damping effect, and when influenced by high frequency vibrations they exert not a damping but a marked silencing effect. The special features of the damping agent dispersion according to the invention enable particularly simple damping devices to be used.

What is claimed is:

1. A pasty-like damping medium dispersion for damping mechanical and acoustical vibrations and consisting essentially of:
  (1) a fluid phase selected from the group consisting of polyethylene glycols, polypropylene glycols, polybutylene glycols and saturated aliphatic and aromatic carboxylic acid esters;
  (2) ground graphite having a leaf-shaped and/or spherical structure and a particle size of less than $100\mu$ and being present in an amount of 40-60% by weight relative to the total weight of the dispersion;
  (3) a wetting agent for the graphite in an amount of 0.5-6% by weight relative to the total weight of the dispersion; and
  (4) a viscosity stabilizer selected from the group consisting of an aluminum silicate and/or silicon dioxide and being employed in an amount of 0.5-5% by weight relative to the total weight of the dispersion;

said dispersion having a viscosity of $(1-4) \times 10^6$ cP at 25° C. and being self-sealing.

2. The pasty-like damping medium dispersion of claim 1 wherein the dispersion has a viscosity of $(1.5-3) \times 10^6$ cP at 25° C.

3. A pasty damping agent dispersion as claimed in claim 1, wherein the fluid phase is an ester of a saturated aliphatic alcohol with a saturated aliphatic $C_5$-$C_{12}$ monocarboxylic acid.

4. A pasty damping agent dispersion as claimed in claim 3, wherein the ester is a carboxylic acid ester of trimethylpropanol, octyl alcohol, nonyl alcohol and/or decyl alcohol.

5. A pasty damping agent dispersion as claimed in claim 3, wherein the ester is caproic acid decylester.

6. A pasty damping agent dispersion as claimed in claim 1, wherein the fluid phase is an ester of a saturated aliphatic $C_5$-$C_{12}$ alcohol with glutaric, adipic or pimelic acid.

7. A pasty damping agent dispersion as claimed in claim 1, wherein the fluid phase is dioctyl-adipic acid ester, didecyladipic acid ester, octyl-decyl-adipic acid ester and/or trimethylpropane-adipic acid-octyl decylester.

8. A pasty damping agent dispersion as claimed in claim 1, wherein the fluid phase is a $C_5$-$C_{12}$ dialkyl ester of benzene dicarboxylic acid or a $C_5$-$C_{12}$ trialkyl ester of benzene tricarboxylic acid.

9. A pasty damping agent dispersion as claimed in claim 8, wherein the diester is the dioctylester or didecylester of phthalic, isophthalic or terephthalic acid.

10. A pasty damping agent dispersion as claimed in claim 8, wherein the triester is the trihexylester of the benzene tricarboxylic acids.

11. A pasty damping agent dispersion as claimed in claim 1, wherein the aluminum silicate is an organophilic bentonite.

12. A pasty damping agent dispersion as claimed in claim 1, wherein the aluminum silicate is ground asbestos.

13. A pasty damping agent dispersion as claimed in claim 1, wherein the graphite consists of a mixture having particle sizes of between $1\mu$ and $0.5\mu$.

14. A pasty damping agent dispersion as claimed in claim 1, wherein the graphite is at least 98.5% pure.

15. A pasty damping agent dispersion as claimed in claim 1, wherein an amino salt of oleic, linoleic, tallow fat, palmitic acid and/or stearic acid is used as the wetting agent.

16. A pasty damping agent dispersion as claimed in claim 1, wherein the graphite is present in an amount of approximately 50% by weight relative to the total weight of the dispersion.

17. A pasty damping agent dispersion as claimed in claim 16, wherein the graphite has a particle size of approximately $1\mu$.

18. A pasty damping agent dispersion as claimed in claim 1, wherein the amorphous silicon dioxide is present in an amount of approximately 3% by weight relative to the total weight of the damping agent dispersion.

19. A pasty damping agent dispersion as claimed in claim 18, wherein the amorphous silicon dioxide has a maximum grain size of $0.1\mu$.

20. A pasty damping agent dispersion as claimed in claim 1, further comprising 0.1-3% by weight relative to the total weight of the dispersion of an anti-oxidizing agent.

21. A pasty damping agent dispersion as claimed in claim 20, wherein sterically restricted alkylphenols and/or thiophenols are employed as the anti-oxidizing agent.

22. A pasty damping agent dispersion as claimed in claim 20, wherein the anti-oxidizing agent is methylene-4,4-bis-(2,6-ditert.-butylphenol) or ditert.-butyl-p-cresol.

23. In a method of damping mechanical and acoustical vibrations employing a damping device having a chamber containing a damping medium, the improvement comrising employing as the damping medium a pasty-like damping medium dispersion consisting essentially of:
  (1) a fluid phase selected from the group consisting of polyethylene glycols, polypropylene glycols, polybutylene glycols and saturated aliphatic and aromatic carboxylic acid esters;
  (2) ground graphite having a leaf-shaped and/or spherical structure and a particle size of less than $100\mu$ and being present in an amount of 40-60% by weight relative to the total weight of the dispersion;
  (3) a wetting agent for the graphite in an amount of 0.5-6% by weight relative to the total weight of the dispersion; and
  (4) a viscosity stabilizer selected from the group consisting of an aluminum silicate and/or silicon dioxide and being employed in an amount of 0.5-5% by weight relative to the total weight of the dispersion; said dispersion having a viscosity of $(1-4) \times 10^6$ cP at 25° C. and being self-sealing.

24. The method of claim 23 wherein the pasty-like damping medium dispersion has a viscosity of $(1.5-3) \times 10^6$ cP at 25° C.

25. The method of claim 23 wherein the fluid phase of the damping medium dispersion is an ester of a saturated aliphatic alcohol with a saturated aliphatic $C_5$-$C_{12}$ monocarboxylic acid.

26. The method of claim 25 wherein the fluid phase is a carboxylic acid ester of trimethylpropanol, octyl alcohol, nonyl alcohol and/or decyl alcohol.

27. The method of claim 25 wherein the fluid phase is caproic acid decylester.

28. The method of claim 23 wherein the fluid phase is an ester of a saturated aliphatic $C_5$-$C_{12}$ alcohol with glutaric, adipic or pimelic acid.

29. The method of claim 23 wherein the fluid phase is dioctyl-adipic acid ester, didecyl-adipic acid ester, octyl-decyl-adipic acid ester and/or trimethylpropanol-adipic acid-octyl decylester.

30. The method of claim 23 wherein the fluid phase is a $C_5$–$C_{12}$ dialkyl ester of benzene dicarboxylic acid or a $C_5$–$C_{12}$ trialkyl ester of benzene tricarboxylic acid.

31. The method of claim 30 wherein the fluid phase is the dioctylester or didecylester of phthalic, isophthalic or terphthalic acid.

32. The method of claim 30 wherein the fluid phase is the trihexylester of benzene tricarboxylic acid.

33. The method of claim 23 wherein the wetting agent of the damping medium dispersion is an amino salt of oleic, linoleic, tallow fat, palmetic acid and/or stearic acid.

34. The method of claim 23 wherein the damping agent dispersion also contains 0.1 to 3% by weight relative to the total weight of the dispersion of an antioxidizing agent.

* * * * *